July 15, 1952   F. J. GARDINER   2,603,177

METHOD OF MAKING METALLIC TELEVISION TUBE BODIES

Filed April 5, 1950   2 SHEETS—SHEET 1

FIG. 1-A.

LINEAR DEVELOPMENT AS PER FIG. 1-A

INVENTOR
FRANK JOHN GARDINER

BY
ATTORNEYS

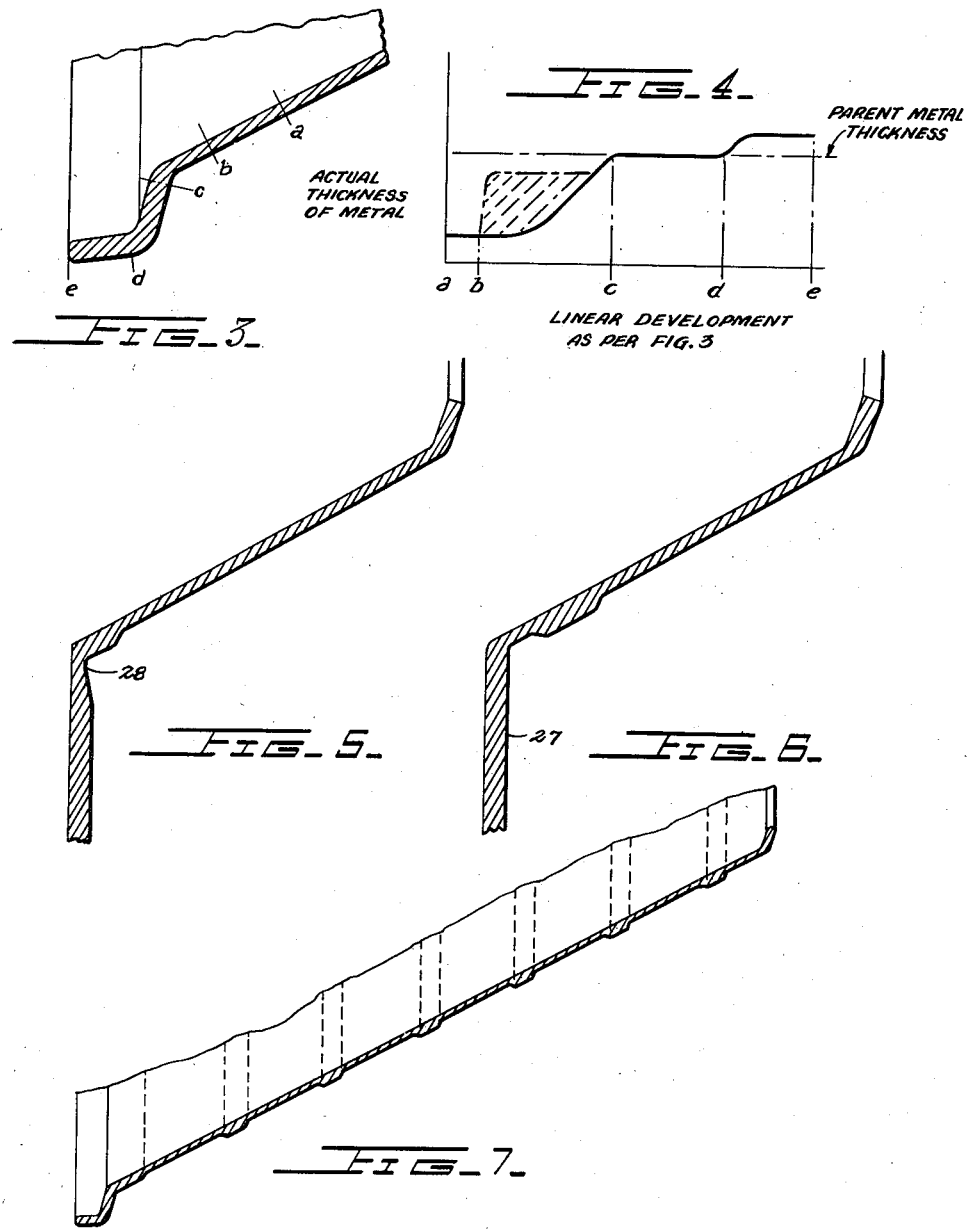

Patented July 15, 1952

2,603,177

UNITED STATES PATENT OFFICE 2,603,177

METHOD OF MAKING METALLIC TELEVISION TUBE BODIES

Frank John Gardiner, Berwyn, Pa., assignor to I-T-E Circuit Breaker Co., Philadelphia, Pa., a corporation of Pennsylvania Application April 5, 1950, Serial No. 154,140

1 Claim. (Cl. 113—52)

My invention relates to metal cones for television tubes, and more particularly relates to a novel method for providing a reinforced lip at the face plate sealing area of the cathode ray tube metal cone.

Cathode ray tubes comprise an electron gun in which the several electrodes are mounted and adjacent which the focusing and deflecting mechanism are arranged; the small end of a metal conical shaped member is sealed to one end of the gun. The large end of the metal cone is provided with a flange or lip for supporting a glass plate which is sealed to the metal cone by applying sufficient heat the flange area to raise the glass temperature until the glass has softened sufficiently to flow and fill in the flange or lip and bond with the metal.

The finished tube is evacuated as is well known to those skilled in the art. Because of the vacuum, the outer surface of the glass sheet, the metal cone and the glass gun are subjected to compressive forces.

In order to withstand this compressive force, the face plate is curved or dome-shaped. Because of the curvature of the glass, the external atmospheric pressure sets up compressive stresses in the outer fibers of the curved glass plate. Likewise, if no provisions were made to the contrary, the glass in the inner fibers would be subjected to high tensile stresses due to a tendency of the curved glass to flatten out under the atmospheric pressure.

It is a well known characteristic of glass that it is capable of withstanding much higher compressive stresses than tensile stresses without fracture. Accordingly, an important object of my invention is to set up initial compressive stresses in the glass counteracting the tensile stresses, and to provide a strong resisting force to any tendency of the glass to flatten out from its dome shape, which flattening out of the glass results in the tensile failure of the glass as described above. To this end, I apply radial compressive force and provide stiffness along the circumferential edge of the glass plate. This results in an increase in compressive stresses on the outer surface of the glass plate and also balances out the tensile stresses in the inner surface of the glass plate.

This radial compressive force and stiffness is achieved by providing a reinforced lip along the circumferential edge of the metal cone where the glass plate is to be sealed to the metal. During cooling, as will be amplified hereafter, the metal shrinks more rapidly than the glass. The reinforced lip having an increased cross-sectional area and moment of inertia will withstand the tensile hoop stresses deriving from the glass and accordingly set up the desired compressive stresses. While there are various methods of securing the reinforced lip, the following general description of my particular method will clarify the invention.

The metal for the cone starts out as a flat disk with one or more holes at its center, to which center the neck portion of the cathode ray tube is ultimately to be secured. This flat disk is placed on a cone form by means of rollers whose axes have movements both parallel to the axis of the cone and at right angles to the axis of the cone, forming a resultant motion parallel to the surface of the cone. A cone is thus spun as is well known to those skilled in the art. This results in $$t = T_{sr} \frac{x}{2}$$

where $t$ is the thickness of the metal cone, $T$ is the thickness of the original disk, and $x$ is the included angle of the cone. This relationship is only approximate.

If inadequate pressure is applied by the rolls onto the metal to be spun, especially in a direction at right angles to the axis of the cone, $t$ can be greater than $$T_{sr} \frac{x}{2}$$

If excess pressure is applied, failure of the metal frequently results.

During the application of a pressure by the rolls on the metal, less than that required for $$t = T_{sr} \frac{x}{2}$$

excess metal must be drawn in from the unspun portion of the disk. Depending on the type of metal and size of disk, as well as its thickness, this process results in a thickening of the cone body or in failure and wrinkling of the metal.

In accordance with my novel process of spinning, I effect a drawing at the lip end of the cone to provide a reinforced lip.

Accordingly, an object of my invention is to provide a novel process for and a novel construction of a reinforced lip.

A further object of my invention is to provide a novel process of spinning a cone.

These and other objects of my invention will appear in the following description and drawings in which Figure 1 is a cross-section of one form of my novel reinforced cone.

Figure 3 is a cross-section of the end of the lip as heretofore employed.

Figure 4 is a schematic linear development of Figure 3.

Figure 5 is a cross-section of the portion of the cone at the reinforced lip showing a modified form of the invention.

Figure 6 is a cross-section of a further embodiment of the reinforced lip.

Figure 7 is a cross-section of a modified form of cone construction.

Figure 1:
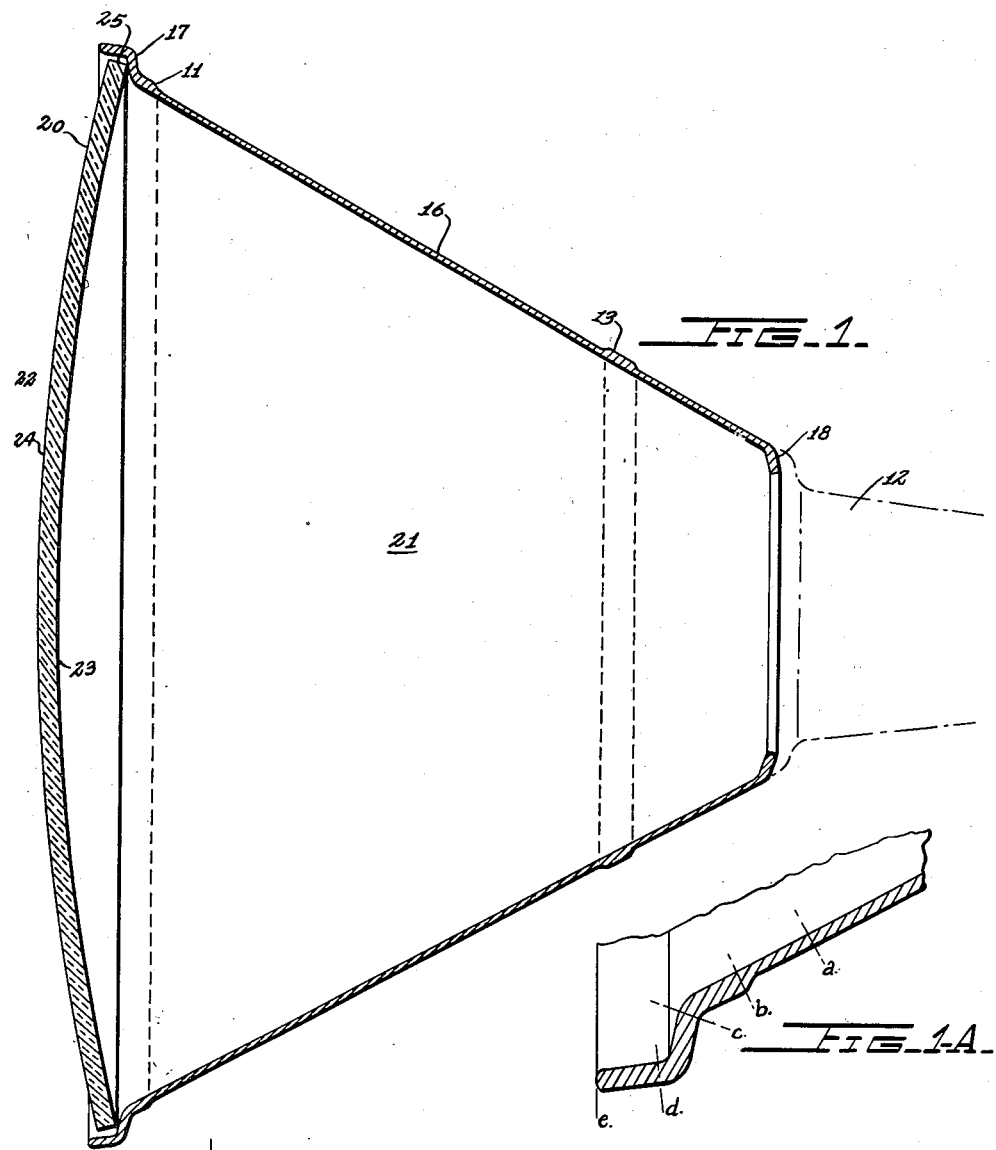
Figure 1A is a reinforced section of my novel cone.

Referring to Figure 1, the cathode ray tube 21 comprises an electron gun enclosed in a glass housing 12 which is in turn sealed to a metal conical tube at surface 18.

As has been pointed out above, in the finished construction the tube is evacuated and accordingly the glass plate 20 is under compression due to atmospheric pressure on these outer surfaces and is normally under tensile stress due to the vacuum on the inside of the tube.

To withstand the external pressure, the face plate 20 has been made into a concave or dome shape, as shown. While this shape will assist in withstanding stresses, there are usually tensile stresses on the glass at the area 23 on the inner section of the glass plate which the glass less effectively withstands.

In accordance with my invention, I have set up radial compressive forces along the circumferential edges of the glass plate to counteract and reduce these tensile stresses. In order to achieve this compressive force along the circumferential edges 25 of the glass, I place a well fitting glass plate 20 in the position shown in Figure 1, so that its circumferential edge 25 is in good fitting engagement with the inner surface of the reinforced lip section 17 of the metal cone. Heat is now applied to a temperature of about from 1000° to 1250° centigrade. During the heating process, the metal 17 expands more rapidly than the glass 20 due to the greater coefficient of expansion of the metal than that of the glass. This greater expansion of the metal will result in some separation between the metal and glass. However, at the sealing temperatures, the glass becomes a viscous liquid and the wetting action between the semi-liquid glass and the hot metal will re-distribute the glass to cover the sealing area 17.

When now the temperature is permitted to fall, the contraction of the metal will again be greater than that of the glass and as the metal shrinks faster than the glass will place a compressive stress on the glass at the circumferential surface 25.

In order to insure adequate compression of the glass, the metal 17 must not yield excessively to the forces exerted by the glass during the cooling process. The degree of yield of the metal is a function of the cross-sectional area and moment of inertia of the metal and its physical configuration at the area 17, and that general vicinity.

In order to secure the maximum cross-sectional area and moment of inertia, I have reinforced the metal lip 17 as shown. This may be secured by welding a reinforcing piece at 17 or directly in the spinning operation.

A blank of the desired thickness and of sufficiently greater outside diameter over the final desired diameter of the cone by the amount of metal residing in the reinforcement 11 and in the lip is placed on the spinning machine and standard spinning is begun in the vicinity of the gun sealing lip 18. This standard spinning is continued through the region 16 up to the beginning of the region where reinforcement 11 is located. During this spinning operation, a component force parallel to the long axis of the cone and a component force at right angles to this axis is applied producing a resultant force at an angle to the cone surface. At the region 11, the forces exerted by the spinning roll or rolls in the direction at right angles to the axis of rotation is reduced by approximately 60%, depending on the kind of metal, its thickness and geometry.

The speed of advance, however, of the rolls is maintained as before in a direction parallel to the axis of rotation of the cone form. This permits metal originally at a greater diameter in the disc to pull radially inwards similar to the well known deep drawing process and thus forms the cross-section area 11 whose thickness is approximately equal to or slightly less than the parent metal.

After this reinforcement 11 has been created, the spinning process is complete and the standard process for finishing the cone may be resumed.

As will now be evident, the amount of thinning out from the parent metal thickness to area 11 is proportional to the reduction in force applied by the rolls at right angles to the axis of rotation.

I have found from experimentation that a maximum thickness can be achieved by a reduction of force of 60%. If this reduction of force is carried beyond this point, vibration and looseness and wrinkling of the cone may result. If a reduction of force less than 60% is used, the full benefit of the increased thickness 11 is not obtained.

During the spinning process, the cross-section at the sections 17 and 18 are made of approximately the same thickness as the original blank from which the cone is formed. Section 16, however, is greatly reduced in thickness. I have found that it is possible to avoid reducing the thickness to that of section 16 in the vicinity of section 17 and thus allow additional metal to remain in the section 11. This metal adds to the cross-sectional area and moment of inertia and provides greater strength thus avoiding excessive yielding at the area 17 during the cooling processes above described, and during application of vacuum inside the tube.

By proper control of the thickness of the cross-section at 17 and at 11, the combined cross-sectional area and moment of inertia at the areas 11 and 17 is about as great as the cross-sectional area and moment of inertia that would be obtained at 17 if metal of greater thickness than that here shown were used.

In view of the fact that the thickness of the blank and therefore its weight is a function of the thickness requirements dictated by area 17, my invention permits the use of thinner metal to achieve the same compressive stresses on the glass and similar stiffness resisting than normally achieved with metal resulting in corresponding saving in cost.

Thus I have found that with reinforcement 11, it is possible to place the same compressive stresses and stiffness on the glass 20 with the parent metal of a thickness of 0.080-0.090 inch as would otherwise be placed on the glass 20 without reinforcements 11 whose parent metal thickness is 0.125 inch.

I have also found that it is possible to create a construction such as shown at 11 by the same process as is recited above in any section of the cone as at 13. This is limited, however, by the elasticity, plasticity and moment of inertia of the annular parent metal disk existent at the time when the reinforcement 13 is attempted.

It is, for instance, possible to reduce the rolling forces at right angles to the axis of rotation during the spinning cycle at some point such as 13. At this point an annulus of parent metal 27 still remains unformed. This annulus has great stiffness in the radial direction and only due to the elasticity and plasticity of the metal 28 in the immediate vicinity of the rolls is any increase in thickness 13 possible.

Given a sufficiently ductile metal composed approximately of 17% chromium, 0.10% carbon, 83% iron, and some stabilizer such as columbium, titanium, tungsten, molybdenum or aluminum, in relatively small quantities, after only a short surface length of reinforcement 13 has been achieved, the parent metal thickness at 28 is so reduced that a thinning out process occurs as shown in Figure 6.

At this point the standard shear from spinning is resumed for a short time as at point 28 and if the roll force is increased to its original value, a cone will be finished spun without further complication as shown in Figure 1.

If, however, the force is not increased to satisfy spinning requirements, the process above described will be repeated at certain intervals and will cause a steady fluctuation in the thickness of the cone body 16 throughout the entire length of the tube as shown in Figure 7. More frequently a small flaw in the metal or some other irregularity will result in failure of the metal undergoing the process.

When the annulus 27 is sufficiently weak so that not only a fraction 28 of the metal is sucked into the cone body but the whole annulus is moved radially inwards, this process becomes stable and the thinning out will not re-occur.

Figure 2:
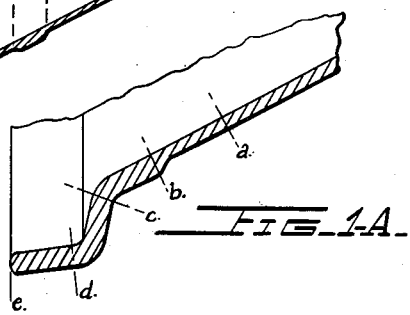
Figure 2 is a diagrammatic showing of the changes in metal thickness.
Figure 2:
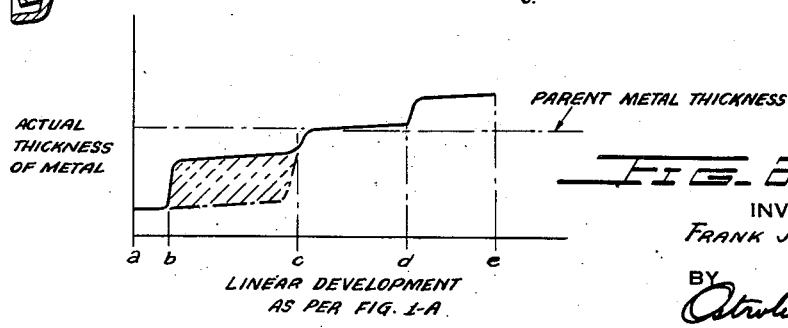

It is at this point that it is desirable to start the reinforcement 11. This point I have found to occur when the annulus is approximately 12 metal thicknesses from its inner to outer dimensions corresponding to point b on Figures 1 and 2 as illustrated in Figure 3.

Most of these experiments have been conducted with one-eighth inch thick metal and it is anticipated that the difference between the inner and outer annulus dimension changes with the metal thickness.

If the forces on the rolls are relaxed before the above described point has been reached, there will occur a thinning out step prior to the forming of the sealing lip 17. This thinning out nullifies the structural value of the increased thickness such as 13.

If the roll forces are decreased after point b has been passed, a satisfactory reinforcement can be made. However, the length of this reinforcement as shown in Figure 3 from b to c will be smaller than is possible and a corresponding lack of increase in strength will be suffered.

While in the above I have described a preferred construction of reinforcement, it will now be apparent that any other process may be employed within the spirit of this invention so long as the metal is placed and connected so as not to yield and thus place the glass under a compressive load along the circumferential edge and to provide greater stiffness. Thus, by proper conditioning of the metal at the lip section or by a modification of its shape, a corresponding increase in the area and moment of inertia may be secured to place the glass under the compressive load and to provide stiffness resisting flattening of the dome shaped glass.

While I have described my invention in connection with television tubes, it will be understood that the principle will be applicable wherever metallic cones are applied and I do not wish to be limited, except as set forth in the appended claim.

I claim:

A method of forming a metallic cone of ductile steel which comprises spinning the metal from a flat disc into a cone shape by applying a rolling force having a component parallel to the axis of the cone and a component at right angles to the axis of the cone up to a point of application of twelve times the metal thickness from the outer edge of the flat disc, thereafter reducing the component of force at right angles to the axis by the order of sixty per cent.

FRANK JOHN GARDINER.

REFERENCES CITED

The following references are of record in the file of this patent:

UNITED STATES PATENTS

| Number | Name | Date |
|---|---|---|
| 8,589 | Hayden | Dec. 16, 1851 |
| 1,270,402 | Fulton | June 25, 1918 |
| 1,316,300 | Griffin | Sept. 16, 1919 |
| 1,728,033 | Blake et al. | Sept. 10, 1929 |
| 1,915,667 | Hiester | June 27, 1933 |
| 1,922,087 | Hiester | Aug. 15, 1933 |
| 1,939,356 | Lindgren | Dec. 12, 1933 |
| 1,968,296 | Hiester | July 31, 1934 |
| 2,232,098 | Deichman | Feb. 18, 1941 |
| 2,254,090 | Power | Aug. 26, 1941 |
| 2,265,723 | Dewey et al. | Dec. 9, 1941 |
| 2,408,596 | Bednar et al. | Oct. 1, 1946 |

OTHER REFERENCES

Metals Handbook, 1948 ed., publ. by The Amer. Society for Metals, Cleveland, Ohio, p. 584. (Copy in Div. 14.)